BEST AVAILABLE COPY

J. VAN DUSSEN REED

FIRE-HOSE.

No. 7,442. Reissued Dec. 19. 1876

*Fig. 3.*

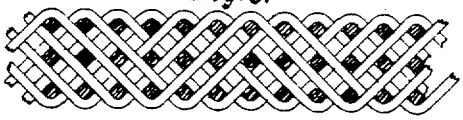

*Fig. 4.*

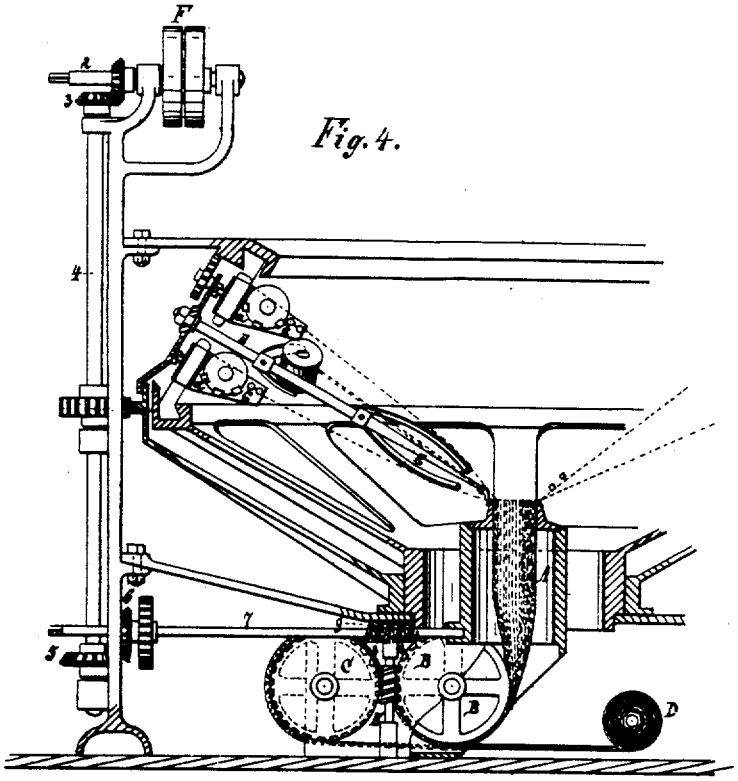

*Fig. 1.*

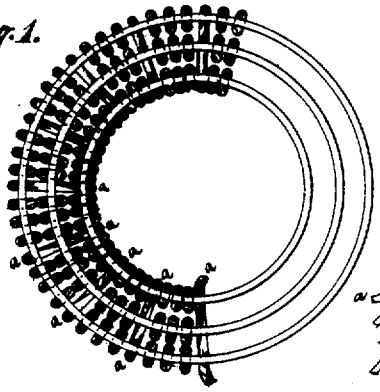

*Fig. 2.*

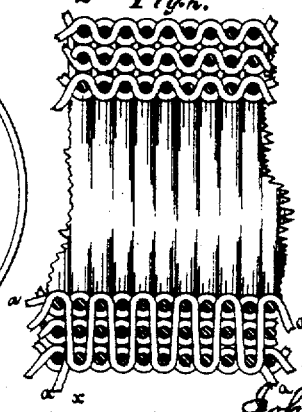

*Witnesses:*

Theodore Kester

B. F. Clark

*Inventor:*

John van Dussen Reed

By J. P. Dick his attorney

Fire or hydraulic hose of more than one ply, composed of cotton, linen, or other analogous material, woven whole in a cylindrical or expanded form, with two or more weft-threads interwound and packed with the woof-threads in concentric helical coils one within another, and without any short bends, thus possessing, substantially, uniform strength and a uniform appearance around the entire body, substantially as describe .

BEST AVAILABLE COPY

UNITED STATES PATENT OFFICE.

JOHN VAN DUSSEN REED, OF NEW YORK, N. Y.

IMPROVEMENT IN FIRE-HOSE.

Specification forming part of Letters Patent No. 161,273, dated March 23, 1875; reissue No. 7,442, dated December 19, 1876; application filed October 30, 1876.

DIVISION A.

*To all whom it may concern:*

Be it known that I, JOHN VAN DUSSEN REED, of the city of New York, county and State of New York, have invented a new manufacture, consisting of Improved Woven Hose for fire, hydraulic, and other purposes, of which the following is a specification, reference being had to the accompanying drawings, forming part thereof.

Figure 1 is a cross-section of my new hose, constituted of more than a single ply. Fig. 2 is a longitudinal section of the same. Fig. 3 is a similar view of one of the practicable modifications of the texture of my hose. Fig. 4 is a sectional view of a loom in which, with certain modifications and additions herein described, my new hose may be woven.

My invention relates to a multiply, fire, or hydraulic hose, composed of cotton, linen, or other equivalent material, which, being woven in a cylindrical or equivalent form, without abrupt bends in the weft-strands, in contradistinction to being woven in two flat sheds, with the woof-strands sharply curved where they pass from the one shed around into the other, and the woof-strands being closely packed into the web, is of substantially uniform appearance and strength throughout.

The drawings represent several sections of my three-ply hose, Fig. 1 being a cross section, and Fig. 2 a longitudinal section. Fig. 3 is also a longitudinal section of a three-ply hose, showing a modification in which each and all the warp-threads pass back and forth through the entire thickness of the web.

In Fig. 1 the large circles represent the woof-threads of a three-ply hose, and the small circles the ends of the warp-threads.

Each woof-thread and its adjacent warp-threads constitute, in fact, a distinct web, and then the said three webs are tied together by certain strands *a* of the warp, represented by full lines in Fig. 2 and Fig. 3, which pass through the web from face to face between and crossing the woof-threads.

In order that those skilled in the art may be able to fabricate my new hose, whether two, three or more ply, I will describe a method, and a loom, by which it may be produced, not limiting myself, however, to any special method or instrumentality, my claim in this specification being for the product itself as a new manufacture.

On the 4th day of June, 1872, Letters Patent of the United States were reissued to me for improvement in looms for weaving hats. I have employed said loom, with certain modifications, changes, and additions, in the weaving of my new hose of more than one ply. The general description of that loom I shall not here repeat, but refer thereto for the same, confining my present description to the changes and additions necessary for the production of my new hose.

In order that these changes and additions may be the more readily understood, I have reproduced here in Fig. 4 of the drawings a sectional view of the parts of the said loom by which the warp strands or threads are carried, and the woof-thread delivered into the web and packed therein, with the above-named necessary additions and changes.

In this loom the warp-strands are held on spools carried by jacks, arranged around a circle, the strands converging toward the center of the circle, where they pass down through a hollow cylinder over the upper circular edge of the said cylinder. Just at this edge the woof-strands are woven into the warp by a shuttle, which is carried around the circle and winds the woof into the web spirally, thus forming a continuous cylindrical tube.

The ends of the warp-threads before the operation of weaving in the woof is commenced are gathered together, carried down through the cylinder A, Fig. 4, around under the drum B, over the drum C, and back around a drum or axle, D. By a stress of a weight or spring upon the axle D, the proper strain is given to the warp-threads.

Upon the shafts *c c'* of the drums B C are gears, which are driven by the worm E', to which motion is communicated from the driving-pulley F through the shaft and gears 1, 2, 3, 4, 5, 6, and 7, and the worm and gear 8 and 9.

The warp-carriers or jacks *a* are held between vertical guide-plates or partitions, and are caused to move up and down in their places between said guide-plates by the harness to give the requisite motion to the warp-strands in the act of weaving, the shuttle be-

BEST AVAILABLE COPY ing carried in the end of the arm E, which is attached to the frame carrying the harness, and revolves with it, thus winding the said woof-thread into the web spirally and continuously from end to end of the hose, all of which, so far as relates to the action of the woof-carriers and shuttle, is fully described in the Letters Patent before referred to.

Now, to produce a double-ply web, a second shuttle and shuttle carrying arm are provided, the said arm being attached to the revolving carriage or rings of the loom, the two arms being placed at opposite sides of the loom, each shuttle carrying a separate woof-thread. A certain number of the jacks or warp-carriers are made to carry the threads, to form one of the ply, and an equal number to carry those to form the other ply. The warp-threads for each web are thrown by their carriers to form, with the woof-thread delivered from the shuttle, respectively, a separate web, and then the two webs are tied together into one by another set of the warp-threads, which cross through both webs, back and forth, around the two woof-threads, the jacks carrying these tying threads being, by the direction of the guide-rings of the harness which actuate them, made to thus pass back and forth through the entire thickness of both webs. Usually about every fourth warp-strand is made such tying-strand. A greater or less number may be used at pleasure.

The operation described will produce a fabric the relative position and direction of the several threads of which are represented by the Figs. 1 and 2, the former being a cross-section of the hose, and the latter a longitudinal section. These drawings are made on a greatly enlarged scale, and the strands or threads are represented as separated widely from each other in order that their relative position and direction may be plainly seen.

In the actual web, the strands are of course crowded into close contact with each other. To do this I attach at essentially right angles to the end of the shuttle-carrying arm a divider consisting of two arms, *e e*, formed into an oblate frame. The shuttle travels between the arms of the divider, and delivers the weft evenly and closely between the warp-strands, which are forced apart in its passage, and these warp-strands being closed after the passage of the divider, tie the weft up solidly and firm, and it is further compacted by the next passage of the shuttle and divider.

I do not intend to limit myself to the precise arrangements of the threads described. Another arrangement of the threads is shown in Fig. 3. Any equivalent arrangement may be adopted by which there is produced a tube of the form herein described of several plies tied together into one web. Any mechanic or weaver skilled in the art will know how to adapt the said loom to accomplish such equivalent arrangements of the threads.

To make a three-ply hose, (the one represented in the drawings,) it is only necessary to add a third shuttle and shuttle carrier, divide the warp-threads into three sets beside the tying-strands, one set for each web, and construct and arrange the harness to throw the carriers of the several sets to weave with the three woof strands three separate webs, and then to cause the tying-strands to pass through the three webs and bind them together, or to cause all the warp-threads to cross and recross entirely through the three webs, as seen in Fig. 3.

There are, I believe, novel and patentable devices and combinations above indicated not found in the loom already secured to me by the Letters Patent referred to, and which are necessary on the loom described for the weaving of more than a single ply, which I do not intend to claim in this specification, intending to reserve the same for a separate application for a patent, which it is my purpose to make.

I here claim as a new manufacture—

Fire or hydraulic hose of more than one ply, composed of cotton, linen, or other analogous material, woven whole in a cylindrical or expanded form, with two or more weft-threads interwound and packed with the woof-threads in concentric helical coils, one within another, and without any short bends, thus possessing, substantially, uniform strength and a uniform appearance around its entire body, substantially as described.

Witness my hand this 25th day of October, 1876.

JOHN VAN DUSSEN REED.

Witnesses:

WM. T. FARNHAM,

B. S. CLARK.